(12) United States Patent
Ishikawa et al.

(10) Patent No.: US 6,266,711 B1
(45) Date of Patent: Jul. 24, 2001

(54) SYSTEM FOR ADDING DESIRABLE FUNCTION TO A COMPUTER FROM A PORTABLE ELECTRONIC DATA COMMUNICATION DEVICE TO CONTROL THE PORTABLE DEVICE CONNECTED THERETO

(75) Inventors: Ryo Ishikawa, Saitama-ken; Masaaki Yanagisawa, Fussa, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/120,216

(22) Filed: Jul. 21, 1998

(30) Foreign Application Priority Data

Jul. 29, 1997 (JP) .................................................. 9-203037
Oct. 31, 1997 (JP) .................................................. 9-300693

(51) Int. Cl.$^7$ ...................................................... G06F 13/10
(52) U.S. Cl. ................................. 710/8; 710/10; 710/62; 713/2
(58) Field of Search ................................. 710/8, 10, 62, 710/64, 102, 104; 711/100; 713/2

(56) References Cited

U.S. PATENT DOCUMENTS 4,815,034 * 3/1989 Mackey .................................. 710/64
5,386,567 * 1/1995 Lien et al. ............................ 713/100
5,550,861   8/1996 Chan et al. .
5,815,682 * 9/1998 Williams et al. ..................... 395/500
6,012,113 * 1/2000 Tuckner ................................. 710/64

FOREIGN PATENT DOCUMENTS

04213715 * 8/1992 (JP) .

* cited by examiner

Primary Examiner—Thomas Lee
Assistant Examiner—Thuan Du
(74) Attorney, Agent, or Firm—Frishauf, Holtz, Goodman, Langer & Chick, P.C.

(57) ABSTRACT

In a communication apparatus equipped with a control apparatus, an apparatus main body of this communication apparatus is connectable with an external unit. When this external unit is connected to the apparatus main body, an additional function may be realized in this communication apparatus. The external unit is comprised of a program storage means for previously storing thereinto a program used to control operation of a circuit built in the external unit. The apparatus main body does not store the program, but is comprised of a control means for controlling the operation of the circuit provided in the external unit in accordance with the program previously stored in the program storage means within the external unit.

14 Claims, 5 Drawing Sheets

SYSTEM FOR ADDING DESIRABLE FUNCTION TO A COMPUTER FROM A PORTABLE ELECTRONIC DATA COMMUNICATION DEVICE TO CONTROL THE PORTABLE DEVICE CONNECTED THERETO

BACKGROUND OF THE INVENTION

1. Field of the Invention

The present invention generally relates to a control method, and a control apparatus used in a communication apparatus that communicates with portable electronic data communication appliances, and also a storage medium for storing a control program of such a control apparatus. More specifically, the present invention is directed to such a control apparatus arranged by an apparatus main body, and a connection apparatus capable of providing an additional function, while connecting a separate module to an electronic data communication appliance. Also, the present invention is directed to a control method for realizing such an additional function, and further to a storage medium for storing a control program used to realize such an additional function.

2. Description of the Prior Art

Very recently, various sorts of communication services have been proposed while using public lines. These communication services are realized by connecting, for example, a communication modem functioning as an external expansion unit to a personal computer so as to establish a connection between this personal computer and an external line.

Similar to the personal computer, even in a portable electronic information apparatus typically known as a PDA (personal Digital Assistants), a main body of this PDA is connected via a communication modem (external expansion unit) separately connectable with this PDA to a public line, so that various sorts of communication services are accessible.

Since the protocol for these various sorts of communication services differs from each other, depending upon these sorts, different sorts of communication software (programs) are required. The communication software is needed to execute auto-log-in operations. In the auto-log-in operation, complex sequential operations are automatically processed in which data transmission/reception are controlled, the transmitted/received data are displayed, files are transferred, and desirable communication services are received.

Therefore, in the conventional PDA, several sorts of communication programs suitable to several sorts of communication services have been previously installed in a ROM built in a main body of this PDA. A communication modem functioning as an external expansion unit is mounted on this PDA so as to select a desirable communication service, so that the communication program corresponding to this desirable communication program is initiated to control a CPU provided in this main body, and also a circuit operation of the communication modem.

SUMMARY OF THE INVENTION

The present invention has been made to solve the above described problems, and therefore, has an object to provide a control apparatus constituted by an apparatus main body and a connection apparatus, a control method, and a storage medium for storing a control program. In accordance with such a control apparatus, even when an expansion process operation of an adding function which requires a program not preinstalled in the apparatus main body is carried out, such an expansion process operation added with a desirable function can be readily performed without requiring such a cumbersome operation that after a program has been installed by using an external memory, an expansion unit is connected to the apparatus main body.

To achieve the above-described object, a control apparatus, according to an aspect of the present invention, is featured by such a control apparatus in which an external unit is connected to an apparatus main body so as to add a function to the apparatus main body and the external unit is provided outside the apparatus main body, wherein:

the external unit is comprised of a program storage means for previously storing thereinto a program used to control operation of a circuit built in the external unit; and the apparatus main body does not store the program, but is comprised of a control means for controlling the operation of the circuit provided in the external unit in accordance with the program previously stored in the program storage means within the external unit.

Also, a control method, according to another aspect of the present invention, is featured by such a control method in which an external unit is connected to an apparatus main body so as to add a function to the apparatus main body while the external unit is provided outside the apparatus main body, comprising:

a step for detecting that the apparatus main body is connected to the external unit; and a step for controlling an operation of a circuit employed in the external unit in accordance with a program previously stored in a storage unit of the external unit.

Furthermore, a storage medium, according to another aspect of the present invention, is featured by such a storage medium for storing thereinto a control program used to add a function to an apparatus main body while an external unit is connected to the apparatus main body wherein:

the control program causes a computer to be operated as:

detecting means for detecting that the external unit is connected to the apparatus main body; and control means for controlling operation of a circuit employed in the external unit in accordance with a program previously stored into the external unit under such a condition that the detecting means detects that the external unit is connected to the apparatus main body.

BRIEF DESCRIPTION OF THE DRAWINGS

For a more better understanding of the present invention, reference is made of a detailed description to be read in conjunction with the accompanying drawings, in which.

DESCRIPTION OF THE PREFERRED EMBODIMENT

Referring now to drawings, various preferred embodiments of the present invention will be described in detail.

OUTER APPEARANCE OF COMMUNICATION APPARATUS

Figure 1:
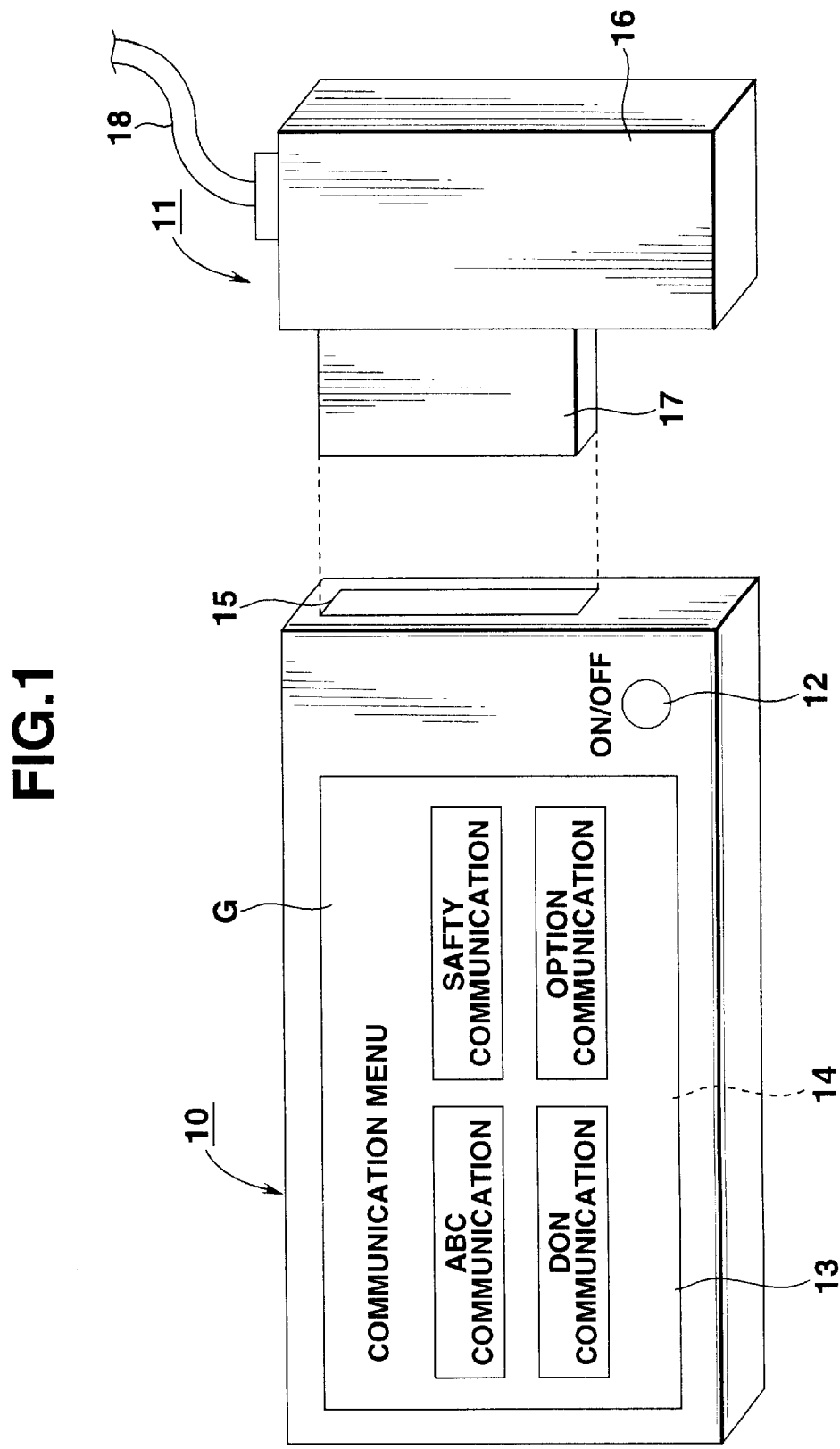
FIG. 1 schematically illustrates an outer appearance of a communication apparatus according to a preferred embodiment of the present invention.

FIG. 1 illustratively shows an outer appearance of a communication apparatus to which a control apparatus according to an embodiment of the present invention is applied.

As indicated in FIG. 1, this communication apparatus is arranged by an apparatus main body 10 and a communication modem 11 separately provided with this apparatus main body 10.

The apparatus main body 10 is equipped with various information process functions and various calculation function, for instance, data input process, data editing process, and data calculation process, and further data storage process. An ON/OFF key 12 and a liquid crystal (LCD) display unit 13 are provided on a front surface of this apparatus main body 10. A transparent tablet 14 is overlapped on this liquid crystal display unit 13, so that this liquid crystal display unit 12 may function as a data-touch-input display screen.

Also, a connecting connector 15 is connectable with the communication modem 11 is provided on a right side surface of the apparatus main body 10.

The communication modem 11 is constituted by a main body case 16 and another connecting connector 17 connectable with the apparatus main body 10. Further, a communication cable 18 is conducted from the main body case 16, and this communication cable 18 is connectable with an external public line (not shown).

CIRCUIT ARRANGEMENT OF COMMUNICATION APPARATUS

Figure 2:
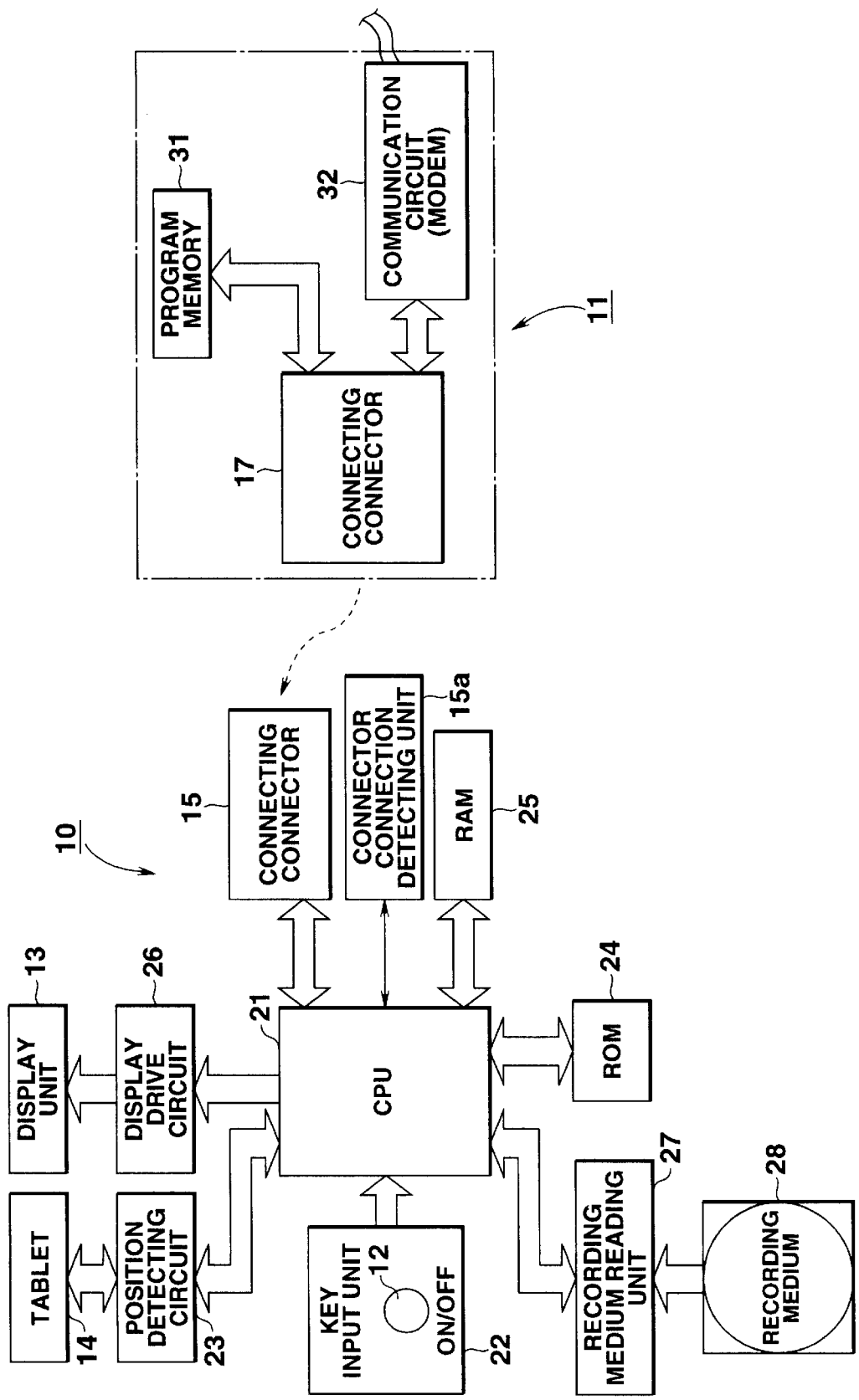
FIG. 2 is a schematic block diagram for showing a circuit arrangement of an apparatus main body and a circuit arrangement of a communication modem employed in the communication apparatus of FIG. 1.

FIG. 2 is a schematic block diagram for representing a circuit arrangement of the apparatus main body 10 and another circuit arrangement of the communication modem 11, employed in the communication apparatus.

The apparatus main body 10 is equipped with a control unit (CPU) 21 constituted by a computer and the like.

The control unit (CPU) 21 initiates a system program previously stored in a ROM 24 in response to key input data entered from a key input unit 12, and touch position data. This touch position data is entered by using a touch pen P via a position detecting circuit 23 from the tablet 14 overlapped on the display screen of the liquid crystal display unit 13. Alternatively, the control unit 21 instructs a recording medium reading unit 27 to read a control program previously stored in an external recording medium 28 so as to initiate this control program. Alternatively, this control unit 21 reads a communication program previously stored in the communication modem 11 via the connecting connector 15 in order to initiate this communication program. Then, the control unit 21 controls operations of the various circuit elements while using a RAM 25 as a work memory.

To this control unit (CPU) 21, the above-explained key input unit 12, liquid crystal display unit 13, tablet 14, position detecting circuit 23, ROM 24, RAM 25, recording medium reading unit 27, and the connecting connector 15 are connected. Furthermore, the liquid crystal display unit 13 is connected via a display drive circuit 26 to the control unit 21.

Also, a connector connection detecting unit 15a is connected to the connecting connector 15. This connection detecting unit 15a detects that the connecting connector 17 of the communication modem 11 is firmly connected to this connecting connector 15 of the apparatus main body 10, and then notifies this connection to the control unit 21.

The tablet 14 is electronically and mechanically overlapped on the display screen of the liquid crystal display unit 13. This tablet 14 may produce a voltage signal along an X direction and another voltage signal along a Y direction in response to a position of this tablet 14 touched by the pen P. In response to the voltage signals corresponding to the touched position outputted from the tablet 14, X, Y coordinate values corresponding to the display screen are detected by the position detecting circuit 23. Based on the touch position coordinate values, the control unit 21 may judge the content of the operation.

As a result, under control of the control unit 21, in response to the coordinate detection data of the pen touch position transferred from the position detecting circuit 23, a trail of the pen touch is displayed on the liquid crystal display unit 13, and also the operation content of the pen touch operation is judged by the content of the display data displayed on this liquid crystal display unit 13.

Into the ROM 24, the following computer programs have been previously stored. That is, system program data used to execute overall process operations of the electronic circuits employed in the apparatus main body 10 have been previously stored. A plurality of sub-programs used to execute various controls corresponding to the respective operation modes, for example, an input mode, and edit mode, a register mode, a retrieve mode, and a calculation mode, have been previously stored. Furthermore, a plurality of communication programs have been previously stored which correspond to a plurality of communication services used to access a predetermined communication service while the main body apparatus 10 is communicated via the communication modem 11 to the external public line.

In the RAM 25, the following storage sections are provided. A display data storage section is employed so as to store display data to be displayed on the liquid crystal display unit 13 as pattern data of a bit map. A storage section is provided so as to store various sorts of process data. Also, a transmission data storage section and a reception data storage section are employed in order to store transmission data and reception data, which are inputted/outputted when the apparatus main body 10 accesses to a communication service.

Then, the input data, the set data, the retrieve data, the transmission/reception data produced by the pen touch operations by the tablet 14 are displayed on the liquid crystal display unit 13 in real time mode.

On the other hand, the communication modem 11 is arranged by a program memory 31 and a communication circuit unit 32.

The connecting connector 17 connectable with the apparatus main body 10 contains a connector used to be connected to both the program memory 31 and the communication circuit unit 32, and a communication cable 18 is conducted from the communication circuit unit 32.

A communication program is previously stored in the program memory 31, and this communication program corresponds to a driver software capable of controlling the communication circuit unit 32 by the control unit (CPU) 21 of the apparatus main body 10 in order to access to a certain one sort of communication service A. The communication modem 11 is used as a communication modem for the communication service A.

It should be understood that when a communication program for another communication service B is previously stored in the program memory 31, this communication modem 11 is used as a communication modem for the communication service B.

In other words, the communication programs corresponding to the different sorts of the communication services are previously stored with respect to each of the communication modems 11. When the communication access operation is carried out by connecting a certain communication modem 11 to the apparatus main body 10, the control unit (CPU) 21 of the apparatus main body 10 directly initiates the communication program previously sorted in the program memory 31 employed in the above-explained communication modem 11 so as to control the communication unit 32 of this communication modem 11. As a consequence, even such a communication program other than several sorts of communication services available by the communication programs previously stored in the ROM 24 can be utilized.

Next, various operations of the communication apparatus with employment of the above-described arrangement will now be described.

COMMUNICATION PROCESS OPERATION BY COMMUNICATION APPARATUS

Figure 3:
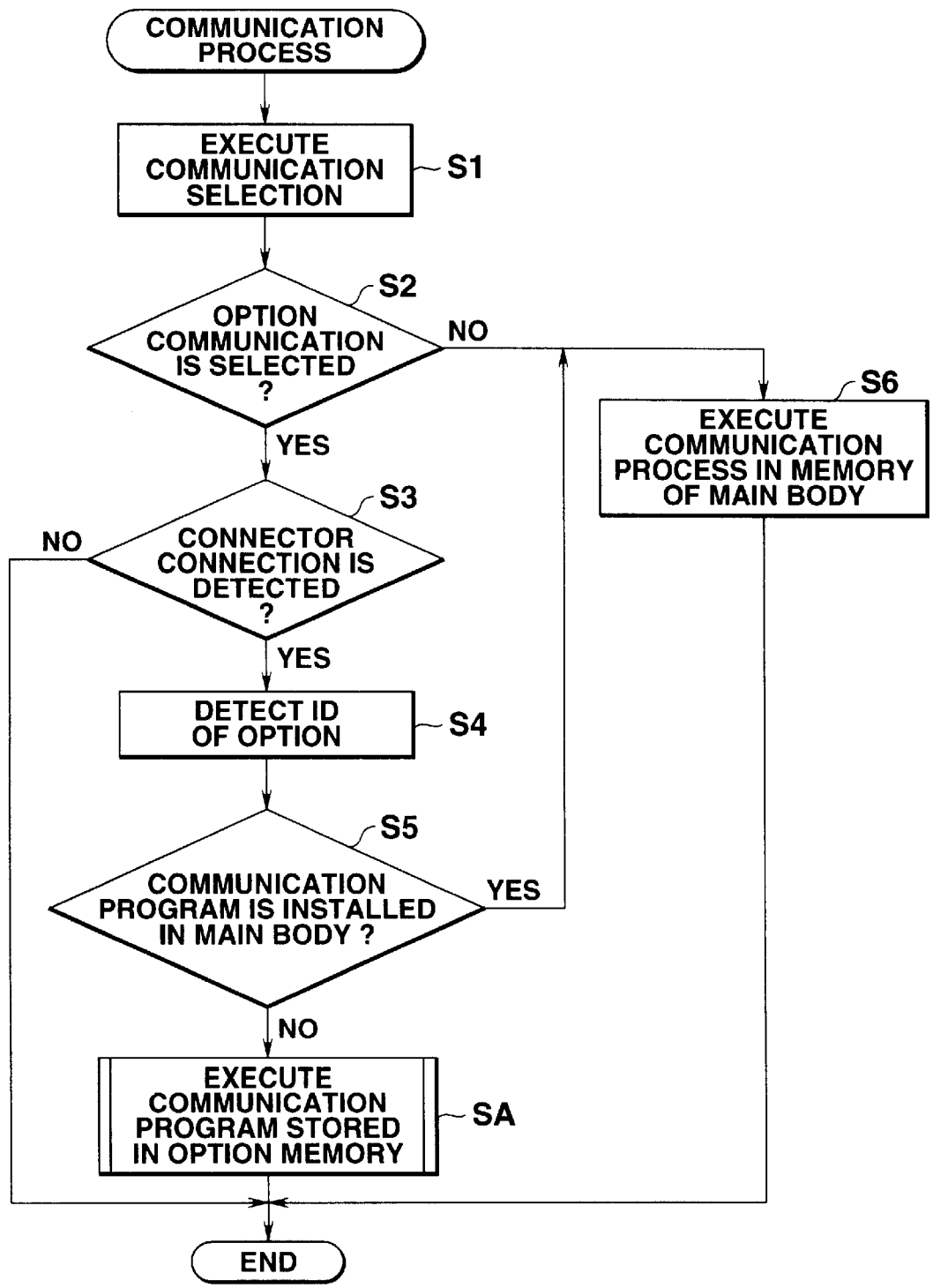
FIG. 3 is a flow chart for describing a communication process operation of the communication apparatus while communicating with a communication service.

FIG. 3 is a flow chart for describing a communication process operation by the above-described communication apparatus with using a communication service.

When the power supply of the apparatus main body 10 is turned ON by manipulating the ON/OFF key 12, a selection menu screen of an operation mode is displayed on the liquid crystal display unit 13. When a menu of "communication" is selected on this mode selection menu screen, a communication selection menu screen G (see FIG. 1) is displayed (step S1). This communication selection menu screen G is to select a sort of a communication service which constitutes a subject for a communication access operation.

In this communication selection menu screen G, for example, 3 sorts of communication service menu, i.e., "ABC communication", "safety communication", and "DON communication", which have been previously stored as the communication program into the ROM 24 built in the apparatus main body are displayed. Furthermore, a menu "option communication" used to access to other communication services is displayed as a lost of this communication selection menu screen G.

Then, in the case that the user wants to access such a specific communication service which requires a specific communication program other than the communication programs previously stored in the apparatus main body 10, when the user selects "option communication" displayed in the list of the above-described communication selection menu screen G, the control unit (CPU) 21 judges as to whether or not this "option communication" is selected via the position detecting circuit 23 from the tablet 14. Also, the control unit (CPU) 21 checks as to whether or not the communication modem 11 is connected to the connecting connector 15 by receiving the notification signal sent from a connector connection detecting unit 15a (step S2 to step S3).

At this stage, for example, in the case that since the communication modem 11 is connected to the connecting connector 15 of the apparatus main body 10, the control unit (CPU) 21 judges that the communication modem 11 is connected based upon the connection detection notification signal issued from the connection detecting unit 15a, a communication service ID indicative of the sort or such a communication program previously stored in the program memory 31 of this connected communication modem 11 is detected. Then, the control unit 21 checks as to whether or not the communication program corresponding to this detected ID code is equal to the communication program preinstalled in the ROM 24 of the apparatus main body 10 (step S3 to steps S4 and S5).

If the control unit 21 judges that the communication program corresponding to the communication service ID detected from the communication modem 11 under connection is not equal to the communication program preinstalled in the ROM 24 of the apparatus main body 10, a communication process (namely, option communication process) is executed in accordance with the option communication program stored in the communication modem 11 under connection (step S5 to step SA).

On the other hand, in such a case that a communication service menu selected from the communication selection menu screen G corresponds to any one of "ABC communication", "safety communication", and "DON communication", whose communication programs have been previously installed in the ROM 24 of the apparatus main body 10, and therefore is not equal to "option communication", the control unit 21 controls the operations of the relevant circuit units employed in the apparatus main body 10 and also the operation of the communication circuit unit 32 of the communication modem 11 in accordance with the communication program corresponding to the selected communication, preinstalled in the ROM 24 of this apparatus main body 10, so that the communication access to a desired communication service is carried out via the communication cable 18 of the communication modem 32 (steps S2 to S6, or steps S5 to S6). This communication access to the desired communication service via the communication cable 18 is also executed in such a case that even when "option communication" is selected and further the communication modem 11 is connected, the control unit 21 judges that the communication program corresponding to the communication service ID detected from this connected communication modem 11 is equal to such a preinstalled communication program in the ROM 24 of the apparatus main body 10.

It should be noted that a communication process program for a communication preparation stage shown in FIG. 3 is previously stored as a communication application program into the ROM 24 of the apparatus main body 10.

OPTION COMMUNICATION PROCESS

Figure 4:
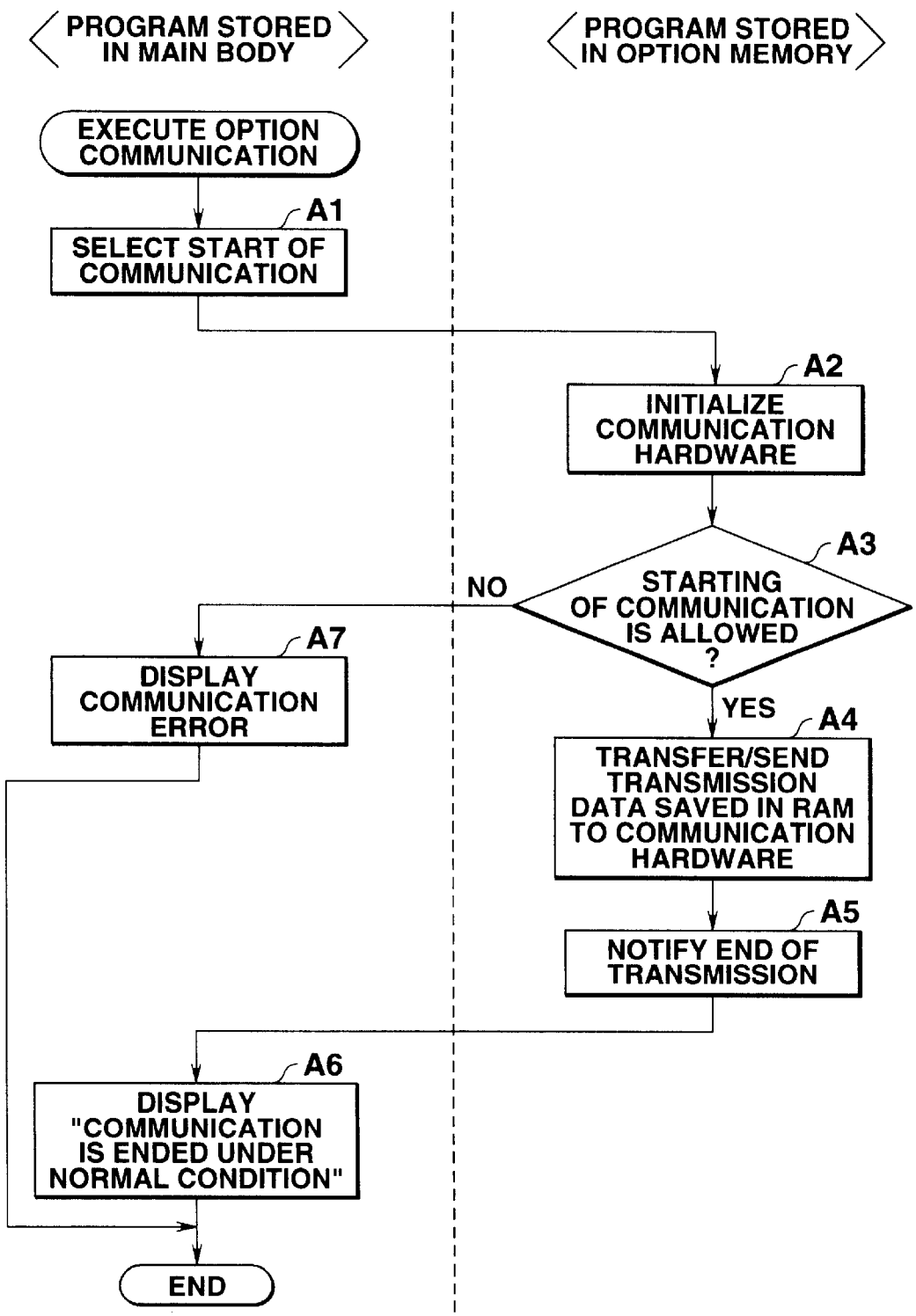
FIG. 4 is a flow chart for describing an option communication process operation of the communication apparatus shown in FIG. 1 in connection with the communication process with the communication service.

FIG. 4 is a flow chart for describing an option communication process operation executed in connection with the communication process operation with the communication service in the communication apparatus.

For instance, in the case that such a communication modem 11 is connected to the apparatus main body 10 and a communication program for a communication service "A" other than the preinstalled communication program of the ROM 24 in the apparatus main body 10 is previously stored in this communication modem 11, when this option communication process operation is initiated (step S1 to step S5 and step SA), a selection operation to commence the transmission operation is first carried out by the control unit 21 in accordance with the communication application program previously stored in the ROM 24 of the apparatus main body 10. Then, a connection confirmation signal is transmitted form the apparatus main body 10 to the communication modem 11 (step A1).

As a result, for example, a communication program (driver software) for this communication service A is read which is previously stored in the program memory 31 of the communication modem 11. In accordance with this communication program, the control unit 21 of the apparatus main body 10 controls operations of the relevant circuit units employed in this apparatus main body 10, and the operations of the communication circuit unit 32 in the communication modem 11. As a consequence, this communication circuit unit 32 is initialized, and further the communication service A is logged in via the external public network (step A2).

Thus, the control unit 21 judges as to whether or not a communication start preparation work with the communication service is accomplished in response to a response signal issued from the communication modem 11 to the apparatus main body 10 (step A3).

Now, when the control unit 21 judges that the initialization process operation in the communication circuit unit 32 is completed and also the log-in operation for the communication service A is accomplished, and thus the communication start preparation is accomplished in response to this response signal, the transmission data which has been formed to be stored in the transmission data storage section within the RAM 25 of the apparatus main body 10 is read out therefrom. Then, the transmission data is transferred to the communication circuit unit 32 of the communication modem 11, and further the operation of this communication circuit unit 32 is controlled in accordance with a communication protocol for this communication service A. As a result, the above-described transmission data is transmitted via the communication cable 18 to the communication service A (step A3 to step A4).

Then, when the data transmission for the communication service A from the communication modem 11 is accomplished, an end notification signal is notified to the apparatus main body 10, and a transmission end message is displayed on the liquid crystal display unit 13 (step A5 and step A6).

As a result, even when such a communication service is accessed which does not correspond to the preinstalled communication program of the ROM 24 employed in the apparatus main body 10, the data access operation to the desirable communication service can be easily performed in such a manner that the communication program previously stored in the program memory 31 of the communication modem 11 is read by the control unit 21 of the apparatus main body 10 to control the respective circuit units and the communication circuit unit 32.

On the other hand, if such a judgment is made at the above step A3 that since the initialization process operation for the communication circuit unit is not carried out and also the log-in operation for the communication service A cannot be executed, the communication start preparation is not yet completed, then an error message indicative of "no communication" is displayed on the liquid crystal display unit 13 of the apparatus main body 10 (step A3 to step A7).

Accordingly, in accordance with the communication apparatus with employment of the above-described arrangement, a desirable communication access operation can be very simply carried out as follows. That is, in order to access to the desirable communication service by utilizing the external public line, the program memory 31 into which a desirable communication program for this desirable communication access operation has been previously stored is built in the communication modem 11 connectable with the apparatus main body 10. When the "option communication" is selected from the communication selection menu screen G, the desirable communication program preinstalled in the program memory 31 of the communication modem 11 under connection is read. Then, in accordance with the communication protocol of the corresponding communication destination the control unit 21 and the communication circuit unit 32 provided in the communication modem 11 are controlled. Therefore, even when the communication program corresponding to the desirable communication service is not preinstalled in the ROM 24 of the apparatus main body 10, a desirable communication access operation can be very simply carried out by using the communication modem 11 exclusively used to this desirable communication service.

It should be also noted that in the above-described embodiment, the communication program previously stored in the program memory 31 of the communication modem 11 is directly read by the control unit (CPU) 21 employed in the apparatus main body 10 so as to control the operations of the communication circuit unit 32. Alternatively, for instance, after the communication program installed in the communication modem 11 may be down-loaded to be installed into the RAM 25, or a flash ROM employed in the apparatus main body, this installed communication program may be read by the control unit 21 so as to initiate this communication program under the following two conditions. That is, as indicated in a flow chart of FIG. 5, the communication program installed in the communication modem 11 is equal to such a sort of communication program not preinstalled in the ROM 24 of the apparatus main body 10. Furthermore, even when the communication program preinstalled in the above-described communication modem 11 is equal to such a sort of communication program preinstalled in the ROM 24 of the apparatus main body 10, in the case that the version of the communication program stored in the communication modem 11 is newer than the version of the communication program preinstalled in the ROM 24 of the apparatus main body 10.

DOWN-LOAD PROCESS OPERATION OF OPTION PROGRAM

Figure 5:
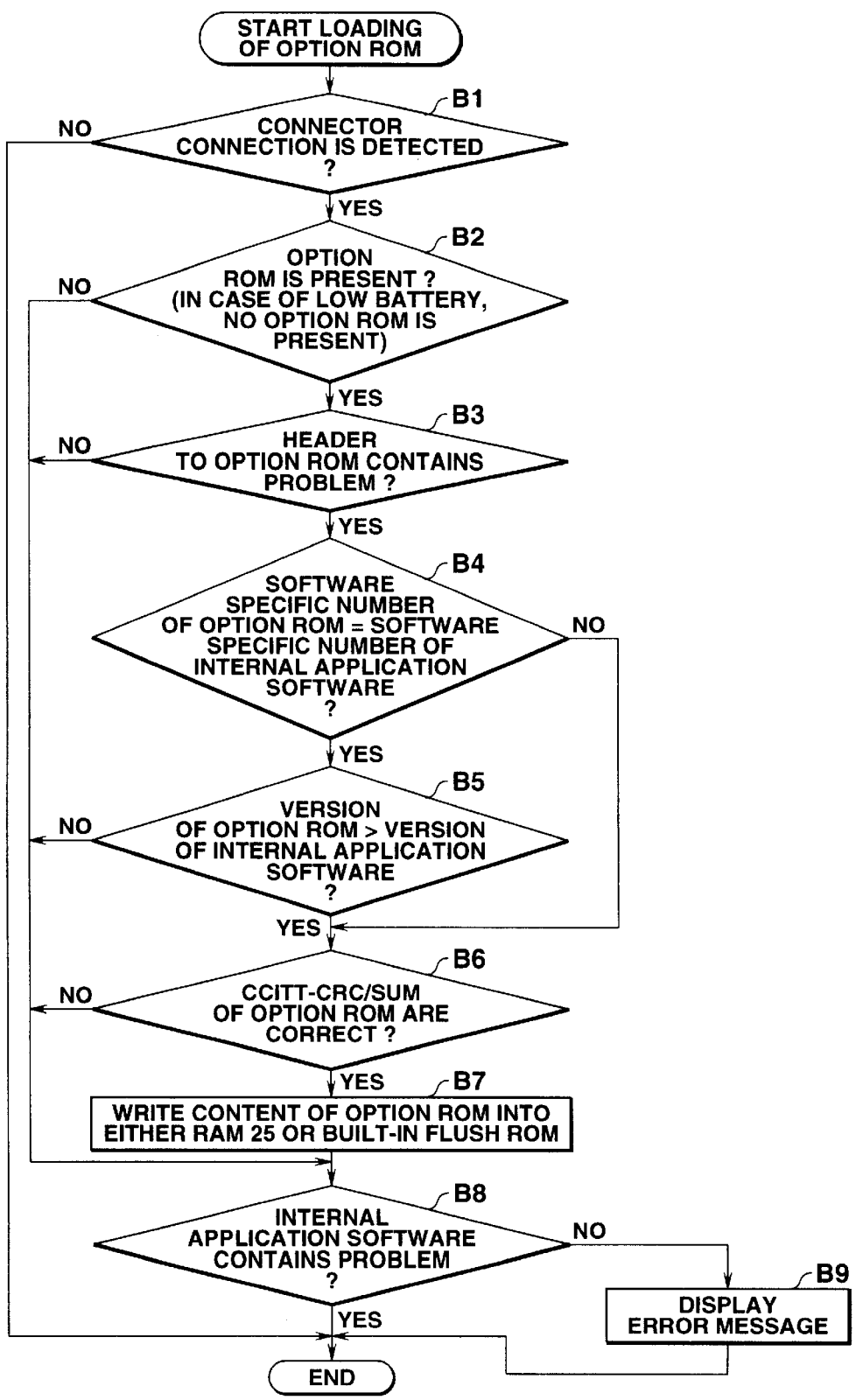
FIG. 5 is a flow chart for explaining a down load process operation of an option program executed in the communication apparatus of FIG. 1.

FIG. 5 is a flow chart for describing a down-load process operation the option program executed by the above-described communication apparatus.

In the flow chart, when the user selects "option communication" displayed in the list of the above-described communication selection menu screen G, the control unit (CPU) 21 judges as to whether or not this "option communication" is selected via the position detecting circuit 23 from the tablet 14. Also, the control unit (CPU) 21 checks as to whether or not the communication modem 11 is connected to the connecting connector 15 by receiving the notification signal sent from a connector connection detecting unit 15a (step B1).

At this stage, for example, in the case that since the communication modem 11 is connected to the connecting connector 15 of the apparatus main body 10, the control unit (CPU) 21 judges that the communication modem 11 is connected based upon the connections detection notification signal issued from the connection detecting unit 15a, this control unit 21 checks as to whether or not the program memory (option ROM) 31 into which a communication program of an option has been previously stored is present in the communication modem 11 (step B1 to step B2).

Then, when such a judgment is made that the program memory (option ROM) 31 is present in this communication modem 11 by the access operation with the communication modem 11 via the connecting connectors 15 and 17, a detecting information region (header) of this program memory (option ROM) 31 is read to confirm an accessible memory (step B2 to step B3). At the same time, the control unit 21 checks as to whether or not an option program ID (specific number) indicative of a sort of a communication program described in this header is made coincident with a main body program ID (specific number) indicative of a sort of a communication program preinstalled in the ROM 24 of the apparatus main body 10. In other words, the control unit 21 judges as to whether or not the sort of the communication program of the option stored in the communication modem 11 under connection is identical to the sort of the communication program preinstalled in the ROM 24 of the apparatus main body 10 (step B4).

At this stage, in such a case that it is so judged that the sort of the option communication program stored in the communication modem 11 under connection is identical to the sort of the communication program preinstalled in the ROM 24 employed in the apparatus main body 10, another check is made as to whether or not the version of the option communication program is newer than the version of the communication program preinstalled in the apparatus main body (step B4 to step B5). Thereafter, in such a case that it is so judged that the sort of the option communication program stored in the communication modem 11 under connection is identical to the sort of the communication program preinstalled in the ROM 24 employed in the apparatus main body 10, but equal to a different communication program (steps B4 to B6), otherwise it is so judged that the version of the option communication program is newer than the version of the communication program preinstalled in the apparatus main body even when such a judgment is made that the communication program of this option is identical to the communication program preinstalled in the apparatus main body (steps B4 to B5 and B6), the option communication program stored in the program memory 31 of the communication modem 11 under connection is read. Then, after such a confirmation is made that the data transfer (ready operation) can be carried out in the correct manner based upon both CRC (Cyclic Redundancy Code) and SUM (check-sum) defined in CCITT, this read option communication program is written into the RAM 25 (otherwise, flash ROM not shown) provided in the apparatus main body 10 (steps B6 to B7).

Finally, another judgment is made as to whether or not a failure happens to occur in the application program preinstalled in the apparatus main body. In the case that it is so judged that the application program is under normal condition, the down-load process operation of this option program is completed (step B8 to END). Then, as indicated in the communication process operation defined in the flow chart of FIG. 4, in accordance with the functions of the application program preinstalled in the apparatus main body and of the option program, the operations of the respective circuit units employed in the apparatus main body 10, and also the operation of the communication circuit unit 32 employed in the communication modem 11 are controlled by the control unit (CPU) 21, so that the communication access operation to the desirable communication service can be executed via the communication cable 18.

To the contrary, in such a case that it is so judged that a failure happens to occur in the application program preinstalled in the apparatus main body 10, an error message of "communication impossible" is displayed on the liquid crystal display unit 31 of the apparatus main body 10 (step B8 to B9).

As a consequence, even in such an embodiment that the option communication program previously stored in the program memory 31 of the communication modem 11 is read to be stored in the RAM 25 (otherwise flash ROM) provided on the apparatus main body 10, similar to the above-described embodiments even when the communication program corresponding to the desirable communication service is not preinstalled in the ROM 24 of the apparatus main body 10, a desirable communication access operation can be very simply carried out by using the communication modem 11 exclusively used to this desirable communication service.

It should be also noted that in the above-described respective embodiments, the communication program previously stored in the program memory 31 of the communication modem 11 is described as the driver software used to control the communication circuit unit 32 in response to the instruction issued from the control unit (CPU) 21 provided in the apparatus main body 10. Alternatively, the application program used to start/accomplish the communication process operation may also be stored into the program memory 31 together with the driver software. Furthermore, the load on the program storage section is the apparatus main body 10 may be reduced.

Also, in the respective embodiments, the expansion process operation to the adding function has been described in which while the external expansion unit connected to the apparatus main body 10 is used as the communication modem 11, the access operation to such a communication service for requiring the communication program which is not previously installed in the apparatus main body 10 is carried out. Apparently, the present invention is not limited to these embodiments, but may be applied to other functions. For example, in such a case that a camera unit equipped with an imaging device of a CCD is connected to this apparatus main body in order to add a digital camera function, a program memory may be provided with this camera unit, and a program used to control an imaging function, a recording function, and a display function as the digital camera may be previously stored. Then, this program may be read by the apparatus main body 10 to initiate the various circuit units of the apparatus main body 10. Similarly, other sorts of external expansion units may be connected to the apparatus main body 10.

Furthermore, the various sorts of programs previously stored in the ROM 24 of the apparatus main body 10 in the respective embodiments may be stored as programs executable by computers into the external storage medium 28, for example, memory cards (ROM card, RAM card), magnetic disks (floppy disks, hard disks), optical disks (DC-ROM, DVD), and semiconductor memories. Then, these external storage media may be distributed. A computer reads this program recorded on this external storage medium 28 by using the external storage reading unit 27, and then the operations are controlled in accordance with the read program. As a consequence, the role on the side of the apparatus main body 10 may be played, which has been explained in the various embodiments.

What is claimed is:

1. A control apparatus in which an external unit is connected to an apparatus main body so as to add a function to said apparatus main body and said external unit is provided outside said apparatus main body, wherein:
- (i) said external unit comprises program storage means on the external unit side for previously storing thereinto a program used to control operation of a circuit built in said external unit; and
- (ii) said apparatus main body comprises:
  - program storage means on the main body side for previously storing thereinto a program used to control operation of said external unit;
  - connection detecting means for detecting a connection between said apparatus main body and said external unit;
  - program judging means for judging as to whether or not said program previously stored into said program storage means on the external unit side is identical to said program previously stored into said program storage means on the main body side under such a condition that the connection between said apparatus main body and said external unit is detected by said connection detecting means; and
  - control means for controlling the operation of the circuit employed in said external unit in accordance with the program previously stored in said program storage means on the external unit side in such a case that said program judging means judges that the program previously stored in said program storage means on the external unit side is not identical to the program previously stored in said program storage means on the main body side.

2. A control apparatus as claimed in claim 1 wherein:
said program previously stored in said program storage means on the external unit side is a program for controlling only the operation of the circuit built in said external unit.

3. A control apparatus as claimed in claim 1 wherein:
said program previously stored in said program storage means on the external unit side is a program used to control the operation of the circuit built in said external unit, and also to control operations executed to start/end an additional function added when said external unit is connected to said apparatus main body.

4. A control apparatus as claimed in claim 1 wherein:
said program judging means includes:
- version judging means for comparing version information about said program previously stored in said program storage means on the external unit side with version information about said program previously stored in said program storage means on the main body side, and for judging as to whether or not said program previously stored in said program storage means on the external unit side is identical to said program previously stored in said program storage means on the main body side based upon said comparison result of the version information.

5. A control apparatus as claimed in claim 1 wherein:
said external unit is a modem used to execute a communication.

6. A control apparatus in which an external unit is connected to an apparatus main body so as to add a function to said apparatus main body and said external unit is provided outside said apparatus main body, wherein:
- (i) said external unit comprises program storage means on the external unit side for previously storing thereinto a program used to control operation of a circuit built in said external unit; and
- (ii) said apparatus main body comprises:
  - program storage means on the main body side for previously storing thereinto a program used to control operation of said external unit;
  - connection detecting means for detecting a connection between said apparatus main body and said external unit;
  - program judging means for judging as to whether or not said program previously stored into said program storage means on the external unit side is identical to said program previously stored into said program storage means on the main body side under such a condition that the connection between said apparatus main body and said external unit is detected by said connection detecting means;
  - program reading means for reading the program previously stored in said program storage means on the external unit side in such a case that said program judging means judges that the program previously stored in said program storage means on the external unit side is not identical to the program previously stored in said program storage means on the main body side;
  - read program storage means for storing the program read from said program storage means on the external unit side by said program reading means; and
  - control means for controlling the operation of the circuit employed in said external unit in accordance with the read program stored in said read program storage means from said program storage means on the external unit side.

7. A control apparatus as claimed in claim 6 wherein:
said program previously stored in said program storage means on the external unit side is a program for controlling only operation of a circuit built in said external unit.

8. A control apparatus as claimed in claim 6 wherein:
said program previously stored in said program storage means on the external unit side is a program used to control the operation of the circuit built in said external unit, and also to control operations executed to start/end an additional function added when said external unit is connected to said apparatus main body.

9. A control apparatus as claimed in claim 6 wherein:
said program judging means includes:
- version judging means for comparing version information about said program previously stored in said program storage means on the external unit side with version information about said program previously stored in said program storage means on the main body side, and for judging as to whether or not said program previously stored in said program storage means on the external unit side is identical to said program previously stored in said program storage means on the main body side based upon said comparison result of the version information.

10. A control apparatus as claimed in claim 6 wherein:
said external unit is a modem used to execute a communication.

11. A control method for use in a system in which an external unit is connected to an apparatus main body so as to add a function to said apparatus main body and said external unit is provided outside said apparatus main body, wherein said external unit comprises program storage means for previously storing thereinto a program used to control operation of a circuit built in said external unit, and wherein said apparatus main body comprises program storage means on the main body side for previously storing thereinto a program used to control operation of said external unit, said method comprising:

detecting a connection between said apparatus main body and said external unit;

judging as to whether or not said program previously stored into said program storage means on the external unit side is identical to said program previously stored into said program storage means on the main body side under such a condition that the connection between said apparatus main body and said external unit has been detected; and controlling the operation of the circuit employed in said external unit in accordance with the program previously stored in said program memory means on the external unit in such a case that the program previously stored in said program storage means on the external unit side has been judged not to be identical to the program previously stored in said program storage means on the main body side.

12. A storage medium having recorded thereon a control program for use in a system in which an external unit is connected to an apparatus main body so as to add a function to said apparatus main body and said external unit is provided outside said apparatus main body, wherein said external unit comprises program storage means for previously storing thereinto a program used to control operation of a circuit built in said external unit, and wherein said apparatus main body comprises program storage means on the main body side for previously storing thereinto a program used to control operation of said external unit, said control program comprising computer readable program code means for causing a computer to operate as:

connection detecting means for detecting a connection between said apparatus main body and said external unit;

program judging means judging as to whether or not said program previously stored into said program storage means on the external unit side is identical to said program previously stored into said program storage means on the main body side under such a condition that the connection between said apparatus main body and said external unit has been detected; and control means for controlling the operation of the circuit employed in said external unit in accordance with the program previously stored in said program memory means on the external unit in such a case that the program previously stored in said program storage means on the external unit side has been judged not to be identical to the program previously stored in said program storage means on the main body side.

13. A control method for use in a system in which an external unit is connected to an apparatus main body so as to add a function to said apparatus main body and said external unit is provided outside said apparatus main body, wherein said external unit comprises program storage means for previously storing thereinto a program used to control operation of a circuit built in said external unit, and wherein said apparatus main body comprises program storage means on the main body side for previously storing thereinto a program used to control operation of said external unit, said method comprising:

detecting a connection between said apparatus main body and said external unit;

judging as to whether or not said program previously stored into said program storage means on the external unit side is identical to said program previously stored into said program storage means on the main body side under such a condition that the connection between said apparatus main body and said external unit has been detected;

reading the program previously stored in said program storage means on the external unit side in such a case that said the program previously stored in said program storage means on the external unit side has been judged not to be identical to the program previously stored in said program storage means on the main body side;

storing the program read from said program storage means on the external unit side; and controlling the operation of the circuit employed in said external unit in accordance with the stored read program.

14. A storage medium having recorded thereon a control program for use in a system in which an external unit is connected to an apparatus main body so as to add a function to said apparatus main body and said external unit is provided outside said apparatus main body, wherein said external unit comprises program storage means for previously storing thereinto a program used to control operation of a circuit built in said external unit, and wherein said apparatus main body comprises program storage means on the main body side for previously storing thereinto a program used to control operation of said external unit, said control program comprising computer readable program code means for causing a computer to operate as:

connection detecting means for detecting a connection between said apparatus main body and said external unit;

program judging means for judging as to whether or not said program previously stored into said program storage means on the external unit side is identical to said program previously stored into said program storage means on the main body side under such a condition that the connection between said apparatus main body and said external unit is detected by said connection detecting means;

program reading means for reading the program previously stored in said program storage means on the external unit side in such a case that said program judging means judges that the program previously stored in said program storage means on the external unit side is not identical to the program previously stored in said program storage means on the main body side;

read program storage means for storing the program read from said program storage means on the external unit side by said program reading means; and control means for controlling the operation of the circuit employed in said external unit in accordance with the read program stored in said read program storage means from said program storage means on the external unit side.

\* \* \* \* \*